(12) United States Patent
Suzuki et al.

(10) Patent No.: US 11,179,890 B2
(45) Date of Patent: Nov. 23, 2021

(54) ADDITIVE MANUFACTURING DEVICE AND ADDITIVE MANUFACTURING METHOD

(71) Applicant: TOSHIBA KIKAI KABUSHIKI KAISHA, Chiyoda-ku (JP)

(72) Inventors: Yuta Suzuki, Numazu (JP); Shuhei Honma, Numazu (JP); Yasushi Fukase, Numazu (JP); Shimpei Fujimaki, Numazu (JP)

(73) Assignee: TOSHIBA KIKAI KABUSHIKI KAISHA, Chiyoda-ku (JP)

( * ) Notice: Subject to any disclaimer, the term of this patent is extended or adjusted under 35 U.S.C. 154(b) by 140 days.

(21) Appl. No.: 16/613,145

(22) PCT Filed: May 15, 2018

(86) PCT No.: PCT/JP2018/018793
§ 371 (c)(1),
(2) Date: Nov. 13, 2019

(87) PCT Pub. No.: WO2018/212193
PCT Pub. Date: Nov. 22, 2018

(65) Prior Publication Data
US 2020/0180222 A1 Jun. 11, 2020

(30) Foreign Application Priority Data

May 16, 2017 (JP) .............................. JP2017-096973

(51) Int. Cl.
*B29C 64/209* (2017.01)
*B33Y 10/00* (2015.01)
(Continued)

(52) U.S. Cl.
CPC ............ *B29C 64/209* (2017.08); *B22F 10/25* (2021.01); *B22F 12/00* (2021.01); *B28B 1/001* (2013.01);
(Continued)

(58) Field of Classification Search
CPC ... B29C 64/153; B29C 64/209; B29C 64/227; B29C 64/236; B29C 64/241;
(Continued)

(56) References Cited

U.S. PATENT DOCUMENTS 9,011,136 B1 4/2015 Uzan et al.
2011/0262622 A1 10/2011 Herre et al.
(Continued)

FOREIGN PATENT DOCUMENTS

CN 204570038 U 8/2015
JP 2016-215346 A 12/2016
(Continued)

OTHER PUBLICATIONS

Extended European Search Report dated Dec. 22, 2020 in European Patent Application No. 18801408.8, 8 pages.
International Search Report dated Jun. 19, 2018 in PCT/JP2018/018793 filed on May 15, 2018.

*Primary Examiner* — Mary Lynn F Theisen
(74) *Attorney, Agent, or Firm* — Oblon, McClelland, Maier & Neustadt, L.L.P.

(57) ABSTRACT

An additive manufacturing device includes a table that supports an additive manufactured object, and a manufacturing unit including a first nozzle that is movable with respect to the table and a second nozzle that is movable with respect to the table and also movable with respect to the first nozzle. The manufacturing unit discharges powder from at least one of the first nozzle and the second nozzle, and emits an energy beam from at least one of the first nozzle and the second nozzle to melt or sinter the powder to additively manufacture the object supported on the table.

10 Claims, 12 Drawing Sheets

(51) Int. Cl.
*B33Y 30/00* (2015.01)
*B29C 64/153* (2017.01)
*B22F 12/00* (2021.01)
*B29C 64/268* (2017.01)
*B22F 10/25* (2021.01)
*B28B 1/00* (2006.01)
*B22F 10/10* (2021.01)

(52) U.S. Cl.
CPC .......... *B29C 64/153* (2017.08); *B29C 64/268* (2017.08); *B33Y 10/00* (2014.12); *B33Y 30/00* (2014.12); *B22F 10/10* (2021.01)

(58) Field of Classification Search
CPC ..... B29C 64/232; B29C 64/268; B22F 10/20; B22F 10/25; B22F 12/37
See application file for complete search history.

(56) References Cited

U.S. PATENT DOCUMENTS

| | | | |
|---|---|---|---|
| 2015/0231827 A1 | 8/2015 | Uzan et al. | |
| 2017/0282297 A1* | 10/2017 | Ohno | B22F 12/00 |
| 2018/0161932 A1* | 6/2018 | Ohno | B23K 26/082 |
| 2018/0207856 A1 | 7/2018 | Seriani | |

FOREIGN PATENT DOCUMENTS

| | | |
|---|---|---|
| JP | 2017-30366 A | 2/2017 |
| JP | 2017-35693 A | 2/2017 |
| WO | WO 2015/125128 A1 | 8/2015 |
| WO | WO 2017/017622 A1 | 2/2017 |

\* cited by examiner

ADDITIVE MANUFACTURING DEVICE AND ADDITIVE MANUFACTURING METHOD

CROSS-REFERENCE TO RELATED APPLICATIONS

This application is a national stage application of International Application No. PCT/JP2018/018793, filed on May 15, 2018, which designates the United States, incorporated herein by reference, and which is based upon and claims the benefit of priority from Japanese Patent Application No. 2017-096973, filed on May 16, 2017, the entire contents of each of which are incorporated herein by reference.

TECHNICAL FIELD

Embodiments of the present invention relate to an additive manufacturing device and an additive manufacturing method.

BACKGROUND ART

Additive manufacturing devices are known that supply a powdered material from a nozzle and emit a laser beam to solidify the material so as to form a layer of the solidified material. The layers of the solidified material are laminated, and as a result, an object having a three-dimensional shape is additively manufactured. The nozzle or a workpiece is disposed, for example, at the distal end of a multi-joint robot arm. This arrangement allows the layers of the material to be laminated in various directions.

CITATION LIST

Patent Literature

Patent Document 1: Japanese Patent Application Laid-open No. 2016-215346

SUMMARY OF INVENTION

Problem to be Solved by the Invention

When the nozzle or the workpiece is disposed at one multi-joint robot arm, the multi-joint robot arm is controlled in a complicated manner, is capable of operating only in a narrow range, or interferes with the object being additively manufactured. Therefore, there is room for improvement in terms of efficiency of the additive manufacturing.

Means for Solving Problem

According to one embodiment, an additive manufacturing device includes: a table configured to support an object for additive manufacturing; and a manufacturing unit including a first nozzle and a second nozzle, the first nozzle that is movable with respect to the table, the second nozzle that is movable with respect to the table and to the first nozzle, the manufacturing unit being configured to discharge powder from at least one of the first nozzle and the second nozzle, and emit an energy beam from at least one of the first nozzle and the second nozzle to melt or sinter the powder to additively manufacture the object supported on the table.

DESCRIPTION OF EMBODIMENTS

The following describes embodiments of the present invention.

Figure 1:
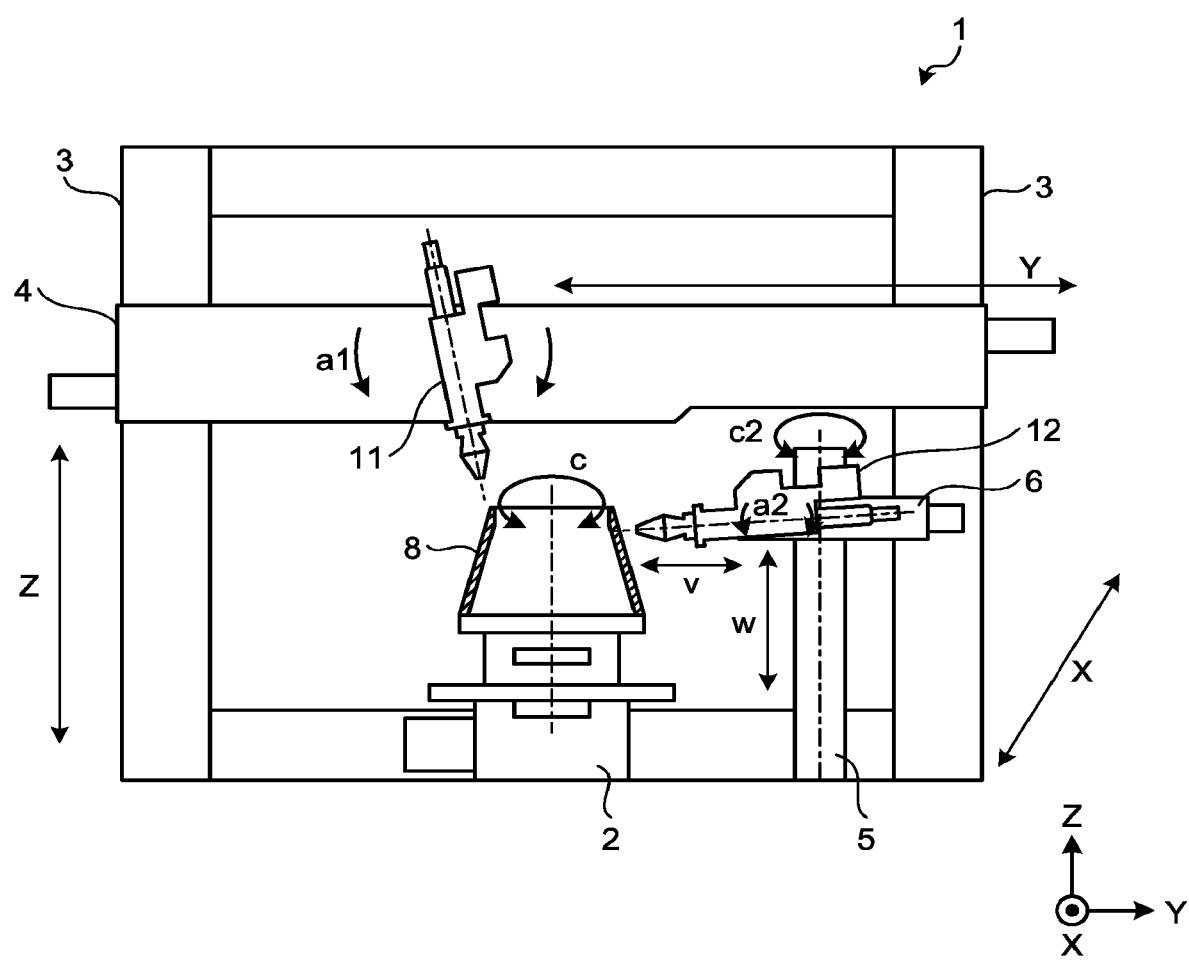
FIG. 1 is an exemplary front view schematically illustrating an additive manufacturing device according to an embodiment.

FIG. 1 illustrates a structure of an additive manufacturing device 1 according to an embodiment of the present invention. The additive manufacturing device 1 additively manufactures an object 8 on a table 2. The table 2 is rotatable about a vertical axis (c-axis).

A pair of first columns 3 is disposed on both sides of the table 2, to support both ends of the span of a first cross rail 4.

The first cross rail 4 supports a first nozzle 11 that ejects a powder material and emits a laser beam to melt the powder material.

The first columns 3 are movable in an X-axis direction by actuators (not illustrated). The first cross rail 4 is movable in a Z-axis direction (vertical direction) by ball screws and actuators disposed in the first columns 3. The first nozzle 11 is movable in a Y-axis direction by a ball screw and an actuator disposed in the first cross rail 4.

The first nozzle is rotatable about an axis (a1-axis) parallel to the X-axis.

A second column 5 is disposed outside the table 2. The second column 5 is rotatable about a vertical axis (c2-axis). A second cross rail 6 is supported by the second column 5 and extends horizontally. Although the second cross rail 6 extends, for example, toward a rotational axis of the table 2, the second column 5 rotates about the c2-axis. As a result, the direction in which the second cross rail 6 extends changes.

The second cross rail 6 supports a second nozzle 12 that ejects a powder material and emits a laser beam to melt the powder material.

The second cross rail 6 is movable in a w-axis direction (vertical direction) by a ball screw and an actuator disposed in the second column 5. The second cross rail 6 is movable in a v-axis direction by a ball screw and an actuator disposed in the second cross rail 6. The v-axis direction represents a linear direction, in which the second cross rail 6 extends from the second column 5, at a constant height (along the Z-axis). The second column 5 is disposed on the right side as viewed from the front side of FIG. 1. However, when the second column 5 is disposed on the front side such that the v-axis is parallel to the X-axis, the first columns 3 and the first cross rail 4 can be restrained from interfering with the second column 5 and the second cross rail 6.

The second nozzle is rotatable about an a2-axis orthogonal to both the v-axis and the w-axis.

The additive manufacturing device 1 additively manufactures the object 8 on the table 2. The additive manufacturing device 1 may additively manufacture a new object 8 on an existing object placed on the table 2. The additive manufacturing device 1 may additively manufacture the object 8 with only the first nozzle 11 or the second nozzle 12. The additive manufacturing device 1 may simultaneously use the first nozzle 11 and the second nozzle 12 to additively manufacture it.

In the case of using both the first nozzle 11 and the second nozzle 12 for additive manufacturing, the first nozzle 11 and the second nozzle 12 may eject the same powder material or different powder materials.

Alternatively, one of the nozzles may be used for ejecting the material, and the other of the nozzles may be used for not ejecting the material but emitting the laser beam for heating. Heating may be preheating or post heating, or concurrent with the manufacturing.

Figure 2:
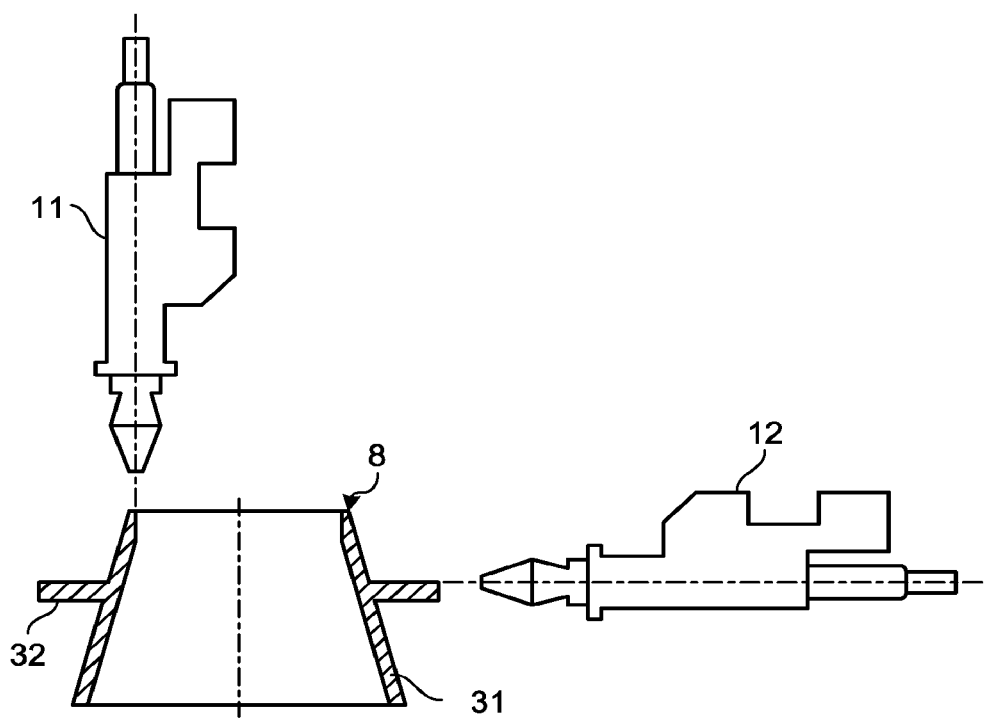
FIG. 2 is an exemplary view schematically illustrating a first example of an additively manufactured object by the additive manufacturing device according to the embodiment.
Figure 2:
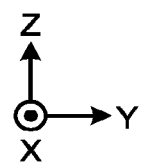

FIG. 2 illustrates an example of manufacturing by the additive manufacturing device according to the embodiment of the present invention. This object 8 includes a truncated cone part 31 and a laterally projecting flange part 32. In this example, the first nozzle 11 forms the truncated cone 31, and the second nozzle 12 forms the flange 32.

It is difficult for the structure such as the first nozzle 11 to form the flange 32 from a horizontal direction of the truncated cone 31. The truncated cone 31 is difficult to form with the second nozzle 12 alone. There are gantry machine tools with a tiltable table which allows the workpiece to be processed from a lateral side. The additive manufacturing device according to the embodiment of the present invention can manufacture an object without tilting the table.

For manufacturing as illustrated in FIG. 2 with only one nozzle, the additive manufacturing device additionally includes a function to tilt the table, or a control for the nozzle with a robot-like freedom. The control of such a structure is complicated. Such a control for the nozzle with a robot-like freedom may lack rigidity or decrease in motion range.

To manufacture the flange 32 using the second nozzle 12 in FIG. 2, the second nozzle 12 is moved to an appropriate position and stopped. Then, one periphery of the flange 32 is formed by simply rotating the table 2. This realizes a simple control.

Figure 3:
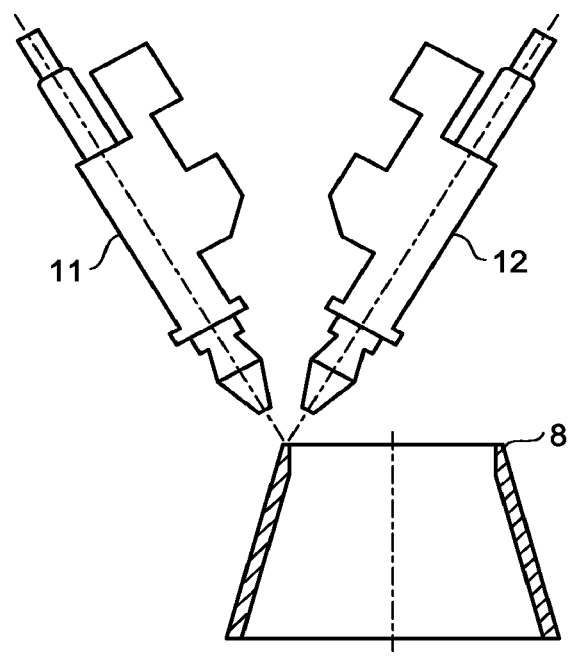
FIG. 3 is an exemplary view schematically illustrating a second example of the object additively manufactured by the additive manufacturing device according to the embodiment.
Figure 3:
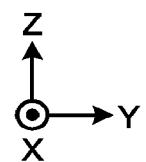

FIG. 3 depicts an example of manufacturing the object 8 by setting the first nozzle 11 and the second nozzle 12 at the same angle with respect to the object 8, and simultaneously ejecting the material. In the additive manufacturing, it is publicly known that the crystal orientation is controlled to any desired direction. The manufacturing device according to the embodiment of the present invention is suitable for controlling the crystal orientation because of high degrees of freedom of the angles of the nozzles with respect to the object. It can manufacture anisotropic materials having strength in a specific direction of load.

In the example of FIG. 3, the additive manufacturing device can manufacture alloys having the controlled crystal orientation by changing the material ejected from each of the nozzles. It can manufacture an object having a different property from other objects by ejecting the material from only one of the nozzles and heating only by the other of the nozzles.

Consider an example of manufacturing only the truncated cone 31 without the flange 32 in the example of FIG. 2. After the truncated cone 31 is formed by the first nozzle 11, the second nozzle 12 only emits the laser to heat the side surface of the truncated cone 31. This can eliminate the roughness of the side surface of the truncated cone 31.

Figure 4:
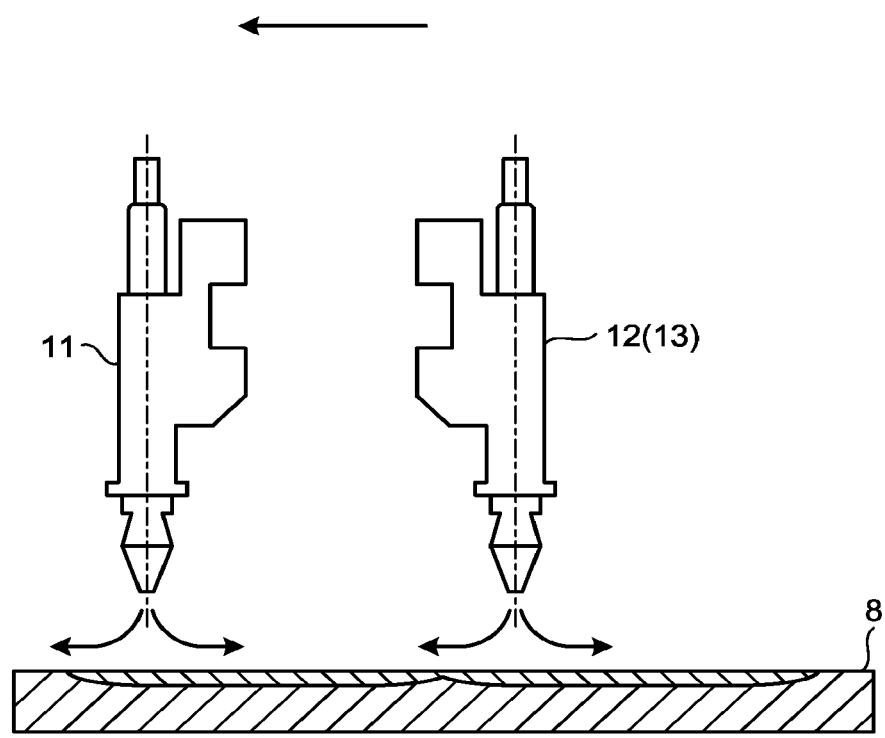
FIG. 4 is an exemplary view schematically illustrating a third example of the object additively manufactured by the additive manufacturing device according to the embodiment.
Figure 4:
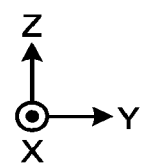

FIG. 4 depicts an example of manufacturing the same surface of the object 8 by two nozzles set at the same angle. In the case of manufacturing using the first nozzle 11 and the second nozzle 12, the angle of the surface that can be formed by two parallel nozzles may be limited. However, in the example of FIG. 2, the side surface of the truncated cone 31 can be formed. Using the first nozzle 11 and a third nozzle 13, as will be described later, will facilitate manufacturing with the two nozzles set in parallel.

For manufacturing, the two nozzles are distanced away from each other sufficiently not to be affected by flows of powder and gas discharged from the distal end of the other nozzle. Alternatively, before a heated part by one of the nozzles used earlier cools down, the other of the nozzles can proceed to forming an object.

The present embodiment illustrates the two nozzles by way of example. However, the number of nozzles can be increased to a larger even number, and every two nozzles can be used as one set for manufacturing. The number of nozzles may not be even, and the number of nozzles in one set may not be two.

Figure 5:
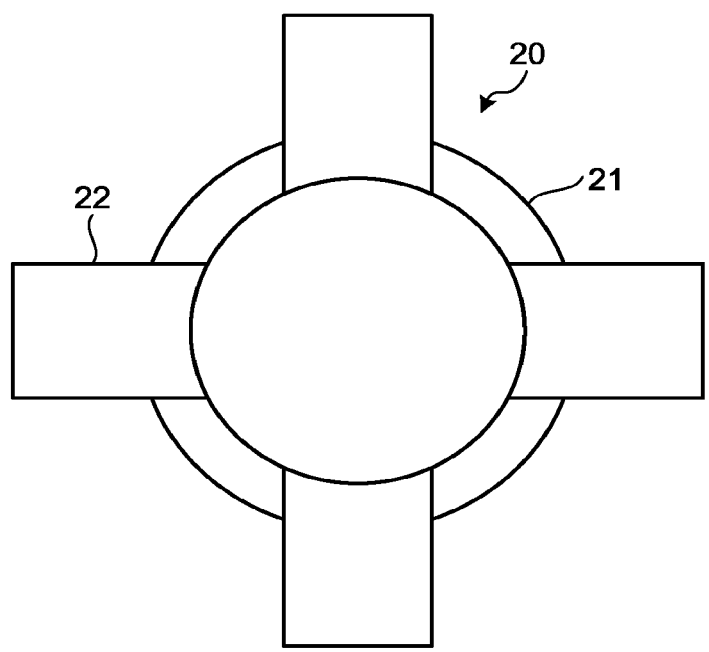
FIG. 5 is an exemplary front view schematically illustrating another object according to the embodiment.
Figure 5:
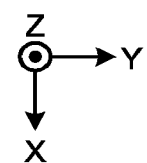
Figure 6:
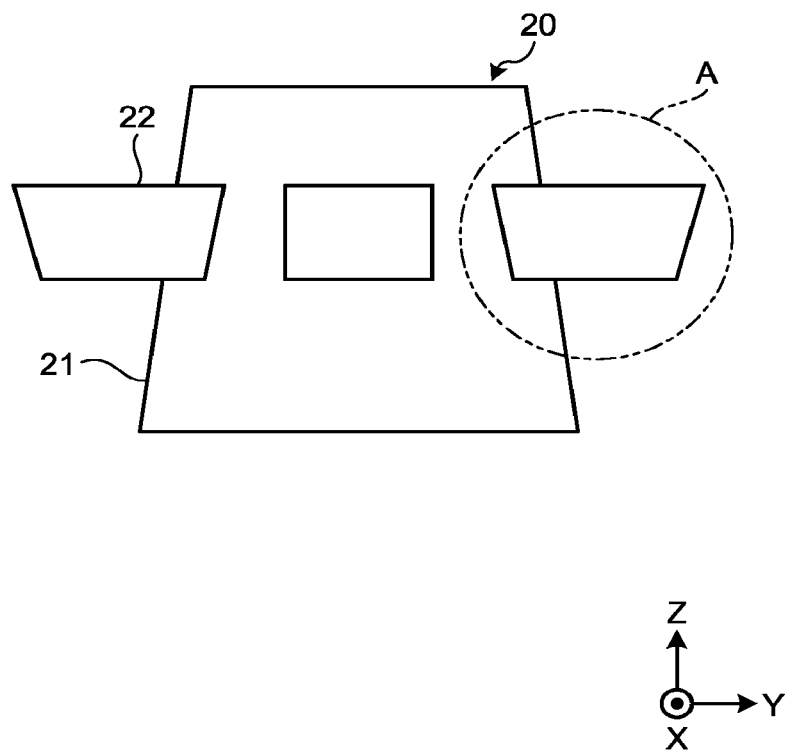
FIG. 6 is an exemplary plan view schematically illustrating another object according to the embodiment.

FIGS. 5 and 6 are an example of another object 20. A truncated cone part 21 of the object 20 is manufactured by another machine tool, and fin parts 22 are additively manufactured. FIG. 5 is a front view of the manufactured object 20, and FIG. 6 is a plan view thereof.

Figure 7:
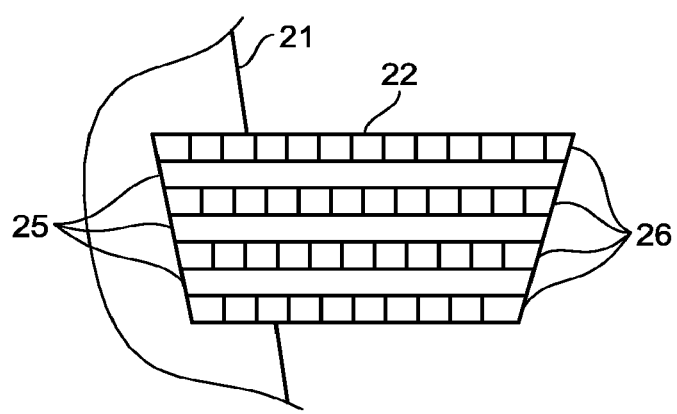
FIG. 7 is an exemplary view schematically illustrating a first example of a fin according to the embodiment.
Figure 7:
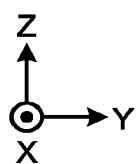
Figure 8:
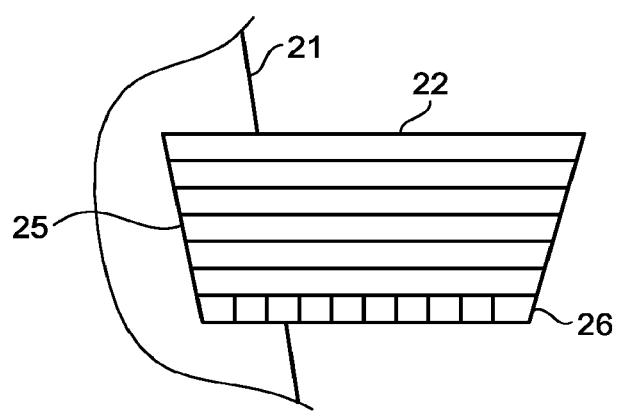
FIG. 8 is an exemplary view schematically illustrating a second example of the fin according to the embodiment.
Figure 8:
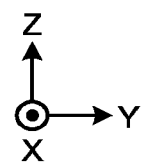

FIGS. 7 and 8 are enlarged views of a part indicated by the letter A in FIG. 6, and illustrate the fins 22 manufactured by different manufacturing methods.

FIG. 7 illustrates the fin 22 including layers 26 manufactured by the second nozzle 12. The layers 26 are concentrically formed in X-Y planes about the rotational center of the truncated cone 21. Layers 25 are radially formed by the first nozzle in parallel to the Y-axis from the center of the truncated cone 21. Thus, by changing the direction of forming the layers, it is made possible to manufacture an object having strength against loads in various directions.

FIG. 8 is an example of the fin 22 including the lowermost layer 26 formed by the second nozzle 12 and the layers 25 formed after the layer 26 by the first nozzle in parallel to the Y-axis. The example of FIG. 8 shows an exemplary object 20 that is additively manufactured in a direction of the layers 25, which is desirable in terms of strength, considering usage conditions of the object 20.

However, if the fin 22 is formed of only the layers 25, the layers 25 are difficult to form unless a jig or the like is placed under the fin 22.

In such a case, the object 20 can be manufactured without the jig, by first radially forming the layers 26 from the rotational center of the truncated cone 21 and then forming the layers 25. The layers 25 may be concentrically or radially manufactured from the center of the truncated cone 21.

Figure 9:
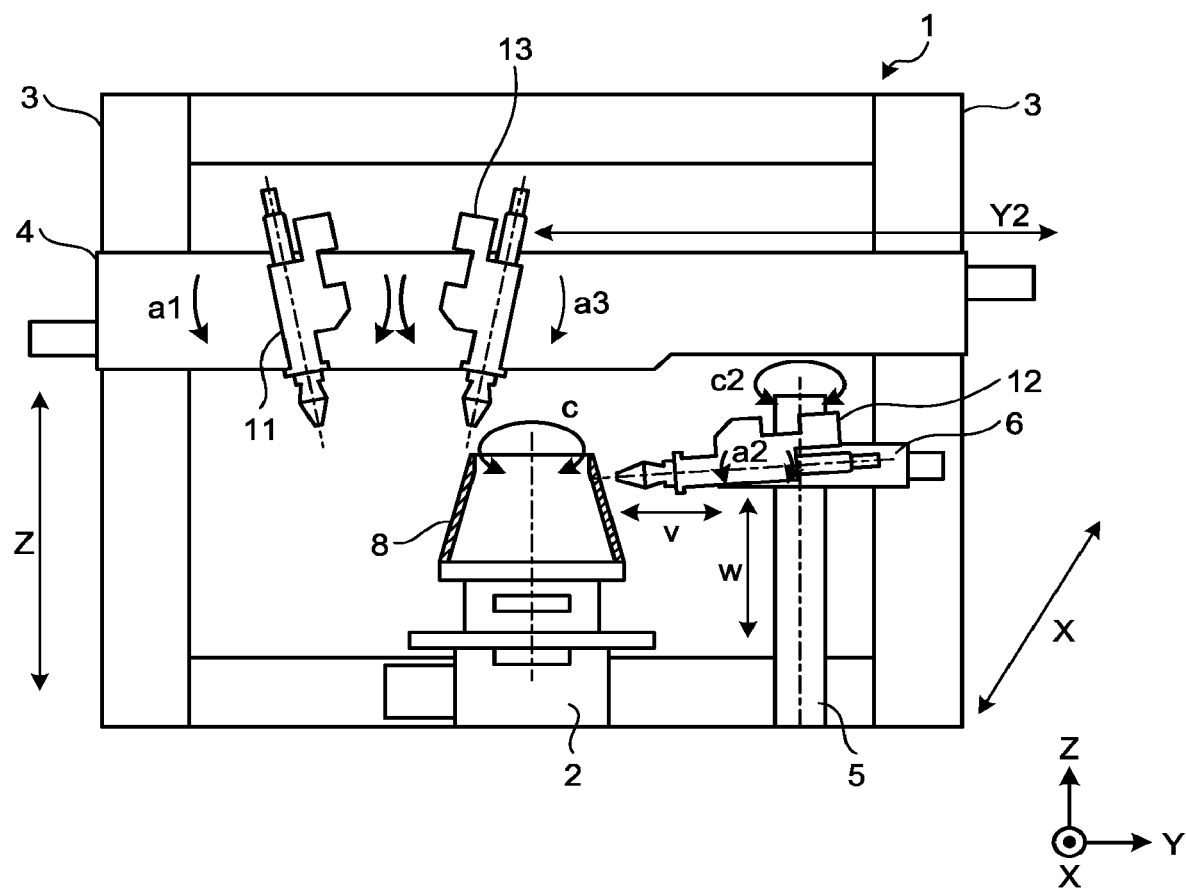
FIG. 9 is an exemplary front view schematically illustrating the additive manufacturing device according to another embodiment.

FIG. 9 depicts another embodiment of the present invention. The additive manufacturing device further includes a third nozzle 13 supported by the first cross rail 4, to eject the powder material and emit a laser beam to melt the powder material. For the third nozzle, an axis (Y2-axis) is set to allow the third nozzle to move in the Y-axis direction independently from the first nozzle 11. An a3-axis is also set to allow the third nozzle to rotate about the X-axis direction. Such a configuration facilitates manufacturing of the object as illustrated in FIG. 3. In FIG. 9, the first nozzle 11 and the third nozzle 13 are supported by the first cross rail 4, but may be supported by independent cross rails.

In FIG. 9, the second nozzle 12 is provided, but only the first nozzle 11 and the third nozzle 13 may be provided.

The following describes the above embodiments in detail. As illustrated in the drawings, X-axis, Y-axis, and Z-axis are defined in this specification. The X-axis, the Y-axis, and the Z-axis are orthogonal to one another. The Z-axis extends, for example, in the vertical direction. The X-axis and the Y-axis extend, for example, in horizontal directions. In the additive manufacturing device 1, the Z-axis may be disposed so as to tilt from the vertical direction.

Figure 10:
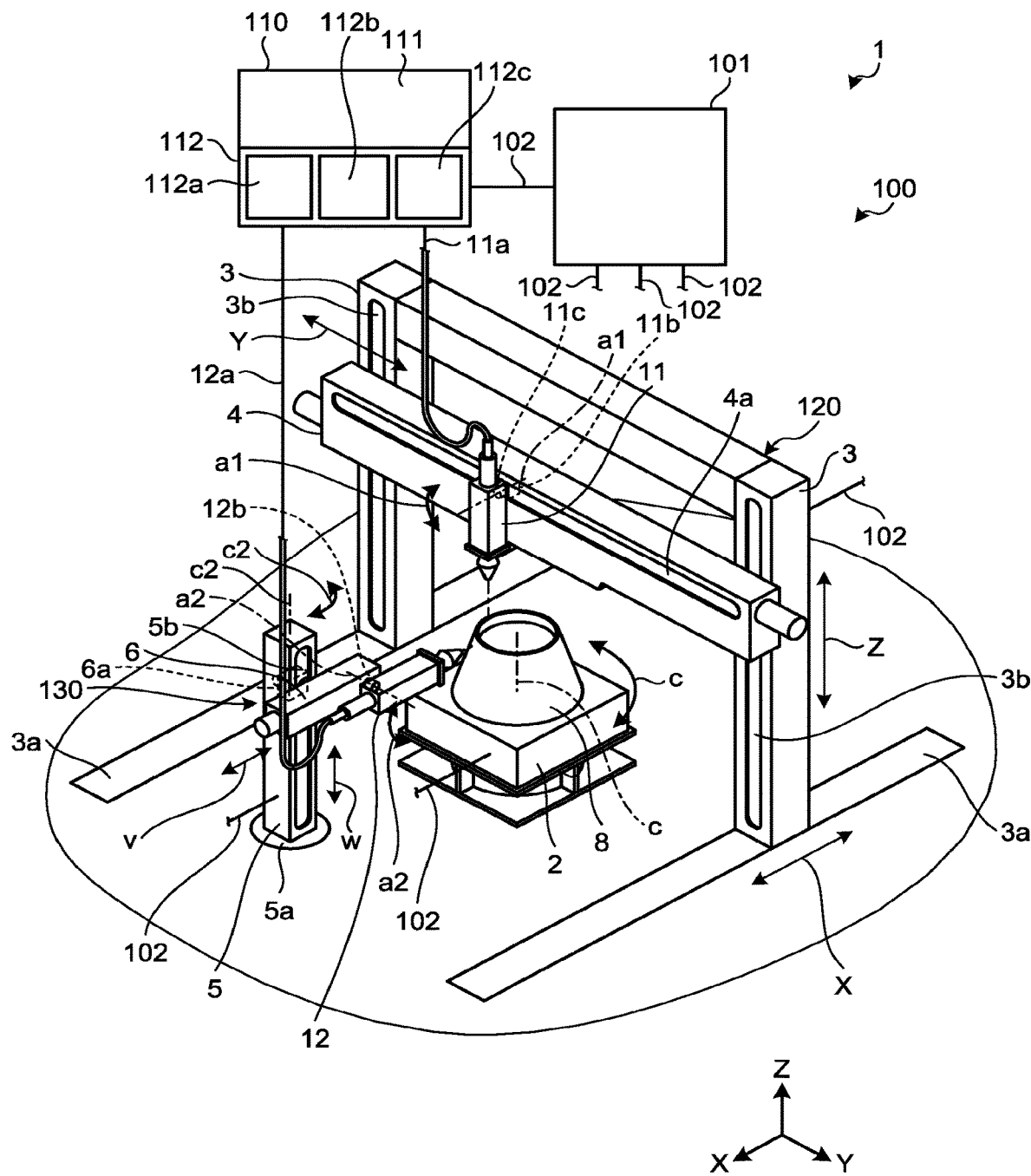
FIG. 10 is an exemplary perspective view schematically illustrating the additive manufacturing device according to the embodiment of FIG. 1.

FIG. 10 is an exemplary perspective view schematically illustrating the additive manufacturing device 1 according to the embodiment of FIG. 1. The additive manufacturing device 1 is a laser material deposition three-dimensional printer. The additive manufacturing device 1 is not limited to this example.

Figure 11:
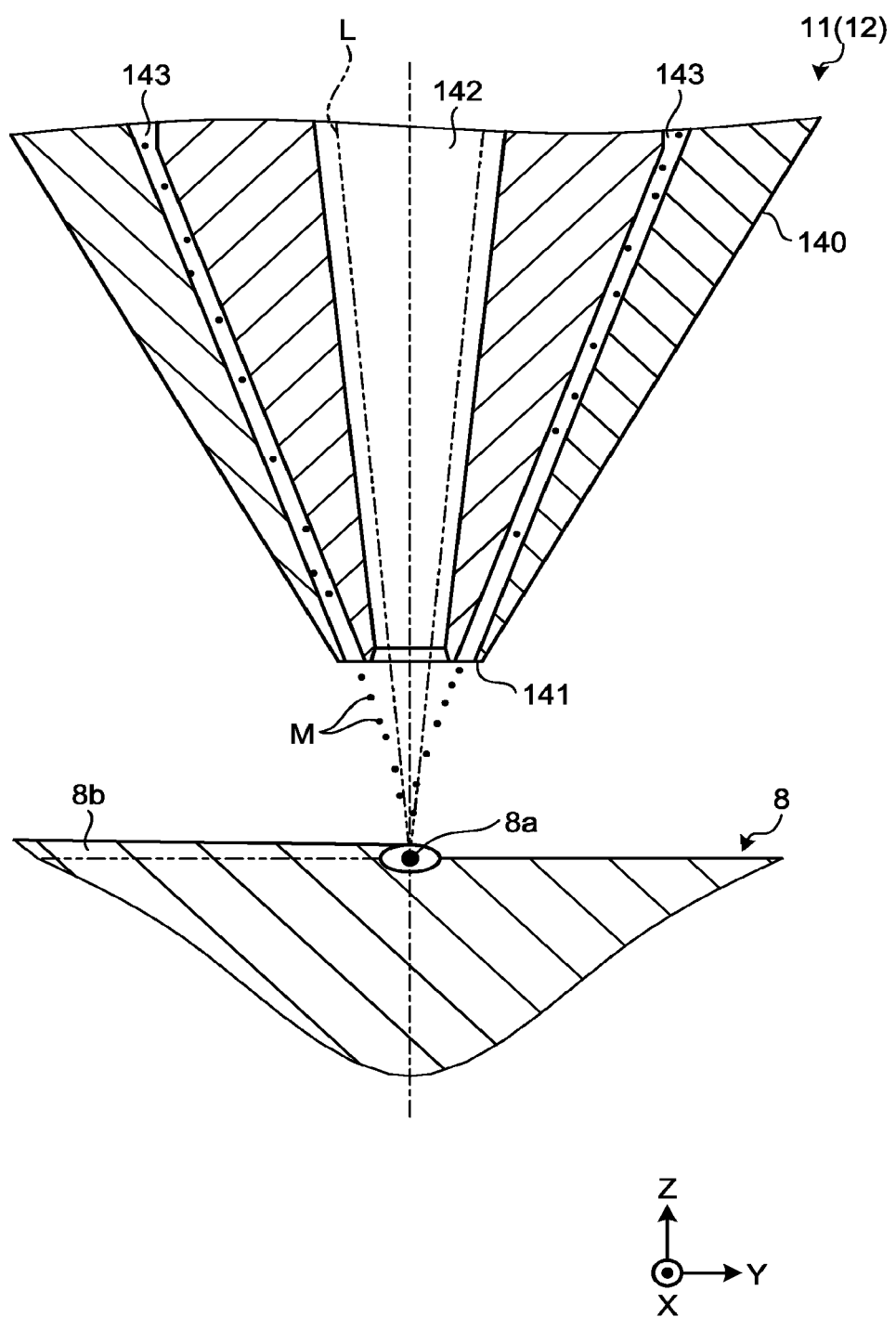
FIG. 11 is an exemplary sectional view schematically illustrating a first nozzle and the object according to the embodiment.

FIG. 11 is an exemplary sectional view schematically illustrating the first nozzle 11 and the object 8 according to the embodiment. The first nozzle 11 and the second nozzle 12 have substantially the same structure. Thus, FIG. 11 illustrates the first nozzle 11, and also substantially illustrates the second nozzle 12.

The additive manufacturing device 1 adds, for example, a layer-upon-a layer of a powdered material M to additively manufacture the object 8 having a given shape. The material M is an example of powder. The object 8 is an example of an object.

The material M is supplied from the first nozzle 11 and the second nozzle 12, and stacked on the table 2 or a base supported on the table 2. The material M is, for example, a powdered metal. The material M is not limited thereto, and may be another material, such as a synthetic resin or a ceramic. The additive manufacturing device 1 may additively manufacture the object 8 from a plurality of types of the material M.

As illustrated in FIG. 10, the additive manufacturing device 1 includes the table 2, a manufacturing unit 100, a controller 101, and a plurality of signal lines 102. The table 2 is an example of a table. The table 2, the manufacturing unit 100, and the controller 101 are, for example, covered with a housing of the additive manufacturing device 1, or disposed in a manufacturing room.

The table 2 supports an additively manufactured object 8, an object 8 in progress, or the base on which layers of the material M is to be added. In the following description, the object 8 includes a completed object 8 by additive manufacturing, an object 8 in progress, and the base. After completion of the additive manufacturing, the object 8 is the laminate of the material M integrated with the base.

At least part of the table 2 rotates to rotate the object 8 supported on the table 2 about the c-axis. The c-axis is an example of a first axis. The c-axis extends in the vertical direction (Z-axis direction). In FIG. 10, the c-axis and an arrow indicating the direction of rotation about the c-axis are each labeled with a sign c.

The table 2 may move the object 8 in the X-axis direction, the Y-axis direction, and the Z-axis direction. The table 2 may also rotate the object 8 about an axis extending in the Y-axis direction and/or an axis extending in the X-axis direction.

The manufacturing unit 100 includes the first nozzle 11, the second nozzle 12, a supply device 110, a first moving device 120, and a second moving device 130. At least one of the first nozzle 11 and the second nozzle 12 discharges the material M to the table 2 or the object 8 on the table 2. As illustrated in FIG. 11, at least one of the first nozzle 11 and the second nozzle 12 emits a laser beam L to the discharged material M and the object 8 on the table 2. The laser beam L is an example of an energy beam.

The laser beam L is emitted from each of the first nozzle 11 and the second nozzle 12 concurrently with the supply of the material M. The beam emitted from each of the first nozzle 11 and the second nozzle 12 is not limited to the laser beam L, and may be another energy beam. The energy beam only needs to be a beam, such as the laser beam L, capable of melting or sintering the material M, and may be, for example, an electron beam, a microwave, or an electromagnetic wave in the ultraviolet range.

The manufacturing unit 100 heats the base and the discharged material M with the laser beam L, and thus forms a molten region 8a. The laser beam L melts or sinters the material M, and congregates the material M in the molten region 8a. In this manner, the molten region 8a can include not only the supplied material M, but also portions of the base and the object 8 irradiated with the laser beam L. The molten region 8a may not only be the completely molten material M, but also be a combination of partially molten portions of the material M.

The molten region 8a is solidified so as to form a layer 8b as an aggregate of the material M of a layer form, a thin film shape, or the like on the base or on the object 8. The material M may be stacked in a granular form into a granular aggregate (layer) by being cooled by transferring heat to the aggregate of the material M.

The manufacturing unit 100 may emit the laser beam L from each of the first nozzle 11 and the second nozzle 12 to the aggregate of the material M to perform annealing treatment thereon. The aggregate of the material M is re-molten or re-sintered by the laser beam L to be solidified into the layer 8b.

The manufacturing unit 100 repeatedly adds the layer 8b to additively manufacture the object 8. In this manner, the manufacturing unit 100 emits the laser beam L from at least one of the first nozzle 11 and the second nozzle 12 to melt or sinter the material M, and thus additively manufactures the object 8 supported on the table 2.

Each of the first nozzle 11 and the second nozzle 12 includes a nozzle head 140. A tip 141 of the nozzle head 140 faces the object 8 with a gap. The nozzle head 140 is provided with an emission channel 142 and a discharge channel 143. The emission channel 142 and the discharge channel 143 are open, for example, at the tip 141.

The emission channel 142 is a hole having a substantially circular section. The laser beam L passes through the emission channel 142, and is emitted out of the nozzle head 140. The discharge channel 143 is a hole having a substantially circular ring-shaped section, and is provided so as to surround the emission channel 142. A carrier gas and the material M pass through the discharge channel 143, and are discharged out of the nozzle head 140.

The nozzle head 140 of the second nozzle 12 sometimes discharges the material M in a substantially horizontal direction from the discharge channel 143. In those cases, the gravity increases the percentage of the material M ejected to below a target position. The additive manufacturing device 1 can increase the percentage of the material M ejected to the target position by tilting the nozzle head 140 of the second nozzle 12 so as to face upward to some extent.

The nozzle head 140 may be provided with a plurality of the discharge channels 143. The discharge channels 143 are separated from one another, and have a substantially circular ring-shaped section as a whole. If the nozzle head 140 faces a substantially horizontal direction, for example, the amount of the material M discharged from the discharge channels 143 located in higher positions is set greater than the amount of the material M discharged from the discharge channels 143 located in lower positions. This setting can reduce the influence of the gravity.

As illustrated in FIG. 10, the supply device 110 includes an optical device 111 and a material supply device 112. The optical device 111 includes, for example, a light source and an optical system. The light source includes an oscillation element, and the oscillation element oscillates to emit the laser beam L. The power of the laser beam L emitted from the light source is changeable.

The light source emits the laser beam L into the optical system. The laser beam L enters the first nozzle 11 and the second nozzle 12 through the optical system. The optical device 111 supplies the laser beam L to the emission channel 142 of each of the first nozzle 11 and the second nozzle 12, and emits the laser beam L from the emission channel 142.

Each of the first nozzle 11 and the second nozzle 12 emits the laser beam L to heat the discharged material M, and thereby can form the layer of the material M and perform the annealing treatment thereon. Each of the first nozzle 11 and the second nozzle 12 can remove an unnecessary portion of the object 8 by emitting the laser beam L.

The material supply device 112 includes a material supply unit 112a, a first tank 112b, and a second tank 112c. The first tank 112b and the second tank 112c contain the material M. The material M contained in the first tank 112b may differ from the material M contained in the second tank 112c.

The material supply unit 112a supplies the material M in the first tank 112b to the first nozzle 11 through a supply pipe 11a. The material supply unit 112a supplies the material M in the second tank 112c to the second nozzle 12 through a supply pipe 12a.

The material supply unit 112a supplies the material M, for example, with the carrier gas to the first nozzle 11 and the second nozzle 12. The carrier gas is, for example, an inert gas, such as nitrogen or argon. The material supply unit 112a supplies the carrier gas and the material M to the discharge channel 143 of the nozzle head 140 through the supply pipe 11a (supply pipe 12a).

The material supply unit 112a includes, for example, a tank that contains the carrier gas, a pump that flows the carrier gas in the tank to the supply pipes 11a and 12a, and a device that supplies the material M in the first tank 112b or the second tank 112c to the flow of the carrier gas. The material supply unit 112a may use another method to supply the material M to the first nozzle 11 and the second nozzle 12.

The supply device 110 may further supply a purge gas and a shielding gas to the first nozzle 11 and the second nozzle 12 through the supply pipes 11a and 12a. The purge gas and the shielding gas are each, for example, an inert gas, such as nitrogen or argon. Each of the supply pipes 11a and 12a includes a pipe through which the carrier gas and the material M pass, a pipe through which the purge gas passes, a pipe through which the shielding gas passes, and a cable through which the laser beam L passes.

The controller 101 is electrically connected to the manufacturing unit 100 and the table 2 through the signal lines 102. The controller 101 includes, for example, a processing device such as a central processing unit (CPU), storage devices such as a read-only memory (ROM), a random access memory (RAM), and a hard disk drive (HDD), and other various devices.

The CPU executes a computer program incorporated in the ROM or the HDD, and thus, the controller 101 controls various units of the additive manufacturing device 1. For example, the controller 101 controls components of the manufacturing unit 100, more specifically, the first nozzle 11, the second nozzle 12, the optical device 111, the material supply device 112, the first moving device 120, and the second moving device 130.

The first moving device 120 includes the pair of first columns 3, the first cross rail 4, a first movable element 11b, and a first rotating mechanism 11c. The first columns 3 are an example of a first moving unit. The first cross rail 4 is an example of a second moving unit. The first movable element 11b is an example of a third moving unit. The first rotating mechanism 11c is an example of a first rotating unit.

The pair of first columns 3 is separated from each other in the Y-axis direction, and extend in the Z-axis direction. The table 2 is located between the pair of first columns 3 in the Y-axis direction. The first columns 3 are movable in the X-axis direction with respect to the table 2, for example, by a moving mechanism 3a provided with the first columns 3 and a floor. The X-axis direction is an example of a first direction. In other words, the direction of movement of the first columns 3 is orthogonal to the extending direction of the c-axis.

The moving mechanism 3a includes various components for moving the first columns 3 in the X-axis direction, such as the actuators provided inside the first columns 3 and rails provided on the floor and extending in the X-direction. The pair of first columns 3 are connected to each other, and are translatable in the X-axis direction.

The first cross rail 4 substantially linearly extends in the Y-axis direction. Both ends of the first cross rail 4 are supported by the pair of first columns 3. In other words, the first cross rail 4 is connected to the first columns 3.

The first cross rail 4 is movable in the Z-axis direction with respect to the first columns 3, for example, by a moving mechanism 3b provided in the first columns 3 and the first cross rail 4. The Z-axis direction is an example of a second direction. In other words, the direction of movement of the first cross rail 4 is orthogonal to the X-axis direction, and parallel to the extending direction of the c-axis.

The moving mechanism 3b includes various components for moving the first cross rail 4 in the Z-axis direction, such as the ball screws and the actuators provided inside the first columns 3. The first cross rail 4 is translatable in the Z-axis direction while extending in the Y-axis direction. In other words, the first cross rail 4 moves along the first columns 3.

The first movable element 11b is movable in the Y-axis direction with respect to the first cross rail 4, for example, by a moving mechanism 4a provided in the first cross rail 4. The Y-axis direction is an example of a third direction. In other words, the direction of movement of the first movable element 11b is orthogonal to the direction of movement of the first columns 3, and is orthogonal to the direction of movement of the first cross rail 4.

The moving mechanism 4a includes various components for moving the first movable element 11b, such as the ball screw and the actuator provided in the first cross rail 4. The first movable element 11*b* represents, for example, a nut of the ball screw disposed in the first cross rail 4. Thus, the first movable element 11*b* is connected to the moving mechanism 4*a* of the first cross rail 4. The first movable element 11*b* is moved by the moving mechanism 4*a* along the first cross rail 4.

The first nozzle 11 is connected to the first movable element 11*b*. The first rotating mechanism 11*c* rotates the first nozzle 11 about the a1-axis with respect to the first movable element 11*b*. The a1-axis is an example of a second axis, and extends in the X-axis direction. In FIG. 10, the a1-axis and an arrow indicating the direction of rotation about the a1-axis are each labeled with a sign a1. The first rotating mechanism 11*c* includes various components for rotating the first nozzle 11, such as an actuator provided inside the first nozzle 11.

The first moving device 120 uses the first columns 3 to translate the first nozzle 11 with respect to the table 2 in the X-axis direction. The first moving device 120 uses the first cross rail 4 to translate the first nozzle 11 with respect to the table 2 in the Z-axis direction. The first moving device 120 allows the first movable element 11*b* to translate the first nozzle 11 in the Y-axis direction with respect to the table 2. The first moving device 120 allows the first rotating mechanism 11*c* to rotate the first nozzle 11 about the a1-axis. As described above, the first moving device 120 moves the first nozzle 11 with respect to the table 2.

The second moving device 130 includes the second column 5, a second movable element 6*a*, the second cross rail 6, and a second rotating mechanism 12*b*. The second column 5 is an example of a second rotating unit. The second movable element 6*a* is an example of a fourth moving unit. The second cross rail 6 is an example of a fifth moving unit. The second rotating mechanism 12*b* is an example of a third rotating unit.

The second column 5 is aligned with the table 2 with spacing in the X-direction, and extends in the Z-axis direction. The second column 5 is located between the pair of first columns 3 in the Y-axis direction. For example, the second column 5 is disposed at an intermediate point between the pair of first columns 3. The second column 5 in FIG. 10 is disposed in front of the table 2, and thus, the first cross rail 4 can be restrained from interfering with the second column 5 and the second cross rail 6. The second column 5 may be located between the table 2 and one of the first columns 3, as illustrated in FIG. 1.

The second column 5 is rotatable about the c2-axis with respect to the table 2, for example, by a rotating mechanism 5*a* provided with the second column 5 and the floor. The c2-axis is an example of a third axis, and extends in the Z-axis direction. In other words, the c2-axis extends parallel to the c-axis. In FIG. 10, the c2-axis and an arrow indicating the direction of rotation about the c2-axis are each labeled with a sign c2. The rotating mechanism 5*a* includes various components for rotating the second column 5 about the c2-axis, such as an actuator provided inside the second column 5.

The second movable element 6*a* is movable in the w-axis direction with respect to the second column 5, for example, by a moving mechanism 5*b* provided in the second column 5. The w-axis direction is an example of a fourth direction, and is a direction parallel to the Z-axis direction (vertical direction). In other words, the direction of movement of the second movable element 6*a* is parallel to the extending direction of the c2-axis.

The moving mechanism 5*b* includes various components for moving the second movable element 6*a*, such as the ball screw and the actuator provided inside the second column 5. The second movable element 6*a* is, for example, a nut of the ball screw disposed in the second column 5. Thus, the second movable element 6*a* is connected to the moving mechanism 5*b* of the second column 5. The second movable element 6*a* is moved by the moving mechanism 5*b* along the second column 5.

The second cross rail 6 is connected to the second movable element 6*a*. The second cross rail 6 substantially linearly extends in the v-axis direction. The v-axis direction is an example of a fifth direction, and is orthogonal to the w-axis direction. In other words, the second cross rail 6 extends in a horizontal direction.

The v-axis direction can be changed by the rotation of the second column 5. The v-axis direction can be parallel to the X-axis as illustrated in FIG. 10 or, for example, parallel to the Y-axis. For example, the v-axis direction is set as a radial direction of the c-axis. In other words, the second cross rail 6 extends in a direction closer to the c-axis or in a direction away from the c-axis.

The second cross rail 6 is movable in the v-axis direction with respect to the second movable element 6*a*, for example, by a moving mechanism provided in the second cross rail 6. The moving mechanism in the second cross rail 6 includes various components for moving the second cross rail 6 in the v-axis direction, such as a ball screw and an actuator.

The second nozzle 12 is connected to the second cross rail 6. The second rotating mechanism 12*b* rotates the second nozzle 12 about the a2-axis with respect to the second cross rail 6. The a2-axis is an example of a fourth axis. In FIG. 10, the a2-axis and an arrow indicating the direction of rotation about the a2-axis are each labeled with a sign a2. The second rotating mechanism 12*b* includes various components for rotating the second nozzle 12, such as an actuator provided in the second nozzle 12.

The a2-axis is orthogonal to the w-axis direction, and extends in a direction orthogonal to the v-axis direction. As a result, the a2-axis is tilted with respect to the c2-axis, and the extending direction of the a2-axis is orthogonal to the extending direction of the c2-axis. In other words, the a2-axis is not parallel to the c2-axis but intersects the c2-axis or is skew with respect to the c2-axis.

The second moving device 130 uses the second column 5 to rotate the second nozzle 12 about the c2-axis with respect to the table 2. The second moving device 130 allows the second movable element 6*a* to translate the second nozzle in the w-axis direction with respect to the table 2. The second moving device 130 uses the second cross rail 6 to translate the second nozzle 12 in the v-axis direction with respect to the table 2. The second moving device 130 allows the second rotating mechanism 12*b* to rotate the second nozzle 12 about the a2-axis. As described above, the second moving device 130 moves the second nozzle 12 with respect to the table 2. The second moving device 130 also moves the second nozzle 12 with respect to the first nozzle 11. In other words, the first nozzle 11 and the second nozzle 12 are movable independently from each other.

As described above, the first moving device 120 translates and rotates the first nozzle 11, and the second moving device 130 translates and rotates the second nozzle 12. With this configuration, the second nozzle 12 can discharge the material M and emit the laser beam L in a direction (X-axis direction in the example of FIG. 10) different from a direction (Z-axis direction in the example of FIG. 10) in which the first nozzle 11 discharges the material M and emits the laser beam L.

The additive manufacturing device 1 additively manufactures the object 8 or the object 20 as described below. The method for the additive manufacturing device 1 to additively manufacture the object 8 or the object 20 is not limited to the one described below.

First, data of a three-dimensional shape of the object 8 or the object 20 is entered from, for example, an external personal computer to the controller 101. The data of the three-dimensional shape is, for example, computer-aided design (CAD) data, but may be other data.

Then, the controller 101 divides (slices) the three-dimensional shape of the above-described acquired data into a plurality of layers. The controller 101 converts (rasterizes or pixelates) the sliced three-dimensional shape into, for example, a group of a plurality of points or cuboids (pixels). In this manner, the controller 101 generates data of a plurality of two-dimensionally shaped layers from the acquired data of the three-dimensional shape of the object 8 or the object 20. The generated data is stored, for example, in the RAM or a storage device of the controller 101.

Then, the first moving device 120 moves and rotates the first nozzle 11 under the control of the controller 101. The second moving device 130 moves and rotates the second nozzle 12 under the controlled of the controller 101. The first nozzle 11 and the second nozzle 12 are disposed in different positions.

Then, under the control of the controller 101, at least one of the first nozzle 11 and the second nozzle 12 discharges the material M, and emits the laser beam L to melt or sinter the material M to form a layer of the material M. While the layer of the material M is formed, the table 2 rotates the object 8 or the object 20. Thus, the layers of the material M are laminated to additively manufacture the object 8 or the object 20.

The position, the direction (angle), the discharge timing of the material M, and the emission timing of the laser beam L of each of the first nozzle 11 and the second nozzle 12 may be included in the data of the three-dimensional shape, or may be calculated by the controller 101 based on the data of the three-dimensional shape. The position, the direction (angle), the discharge timing of the material M, and the emission timing of the laser beam L of each of the first nozzle 11 and the second nozzle 12 can change according to required conditions, for example, the type of the material M, the surface roughness, and the forming time.

For example, to additively manufacture the object 8 of FIG. 2, the first nozzle 11 is moved and rotated by the first moving device 120 so as to discharge the material M and emit the laser beam L in the Z-axis direction. This operation stacks the layer of the material M in the Z-axis direction to additively form the truncated cone 31.

The first moving device 120 stops the first nozzle 11 in a desired position. While the first nozzle 11 discharges the material M and emits the laser beam L, the table 2 rotates the object 8 about the c-axis. Thus, the layer for one turn about the c-axis is formed. In this manner, the simple operation forms the truncated cone 31. While the first nozzle 11 discharges the material M and emits the laser beam L, the first moving device 120 may move the first nozzle 11 to form the layer for one turn about the c-axis.

The second nozzle 12 is moved and rotated by the second moving device 130 so as to discharge the material M and emit the laser beam L in a direction orthogonal to the Z-axis (for example, the Y-axis direction). This operation stacks the layer of the material M in the direction orthogonal to the Z-axis to additively form the flange 32.

The second moving device 130 stops the second nozzle 12 in a desired position. While the second nozzle 12 discharges the material M and emits the laser beam L, the table 2 rotates the object 8 about the c-axis. Thus, the layer for one turn about the c-axis is formed. In this manner, the simple operation forms the flange 32.

In the additive manufacturing, the layer of the material M is stacked on, for example, an already formed portion of the object 8, a jig, or a support. Therefore, when the first nozzle 11 additively forms the flange 32, the jig or the support for supporting the layer of the material M in the Z-axis direction is used. In the present embodiment, however, the second nozzle 12 additively forms the flange 32. The second nozzle 12 can stack the layer of the material M in the Y-axis direction on the already formed truncated cone 31. Accordingly, the second nozzle 12 can additively form the flange 32 without using the jig or the support for supporting the flange 32, and without tilting the table 2.

For example, to additively manufacture the object 8 of FIG. 3, the first nozzle 11 and the second nozzle 12 are moved by the first moving device 120 and the second moving device 130 so as to face the same position from directions different from each other and to discharge the material M and emit the laser beams L. In other words, the first nozzle 11 and the second nozzle 12 are linearly symmetrical or rotationally symmetrical to each other.

A portion formed of the material M discharged from the first nozzle 11 differs from a portion formed of the material M discharged from the second nozzle 12 in crystal elongation direction and crystal orientation. For example, the crystalline texture of the object 8 is elongated parallel to a stacking direction. The stacking direction is a direction of emission of the laser beam L by each of the nozzles. Therefore, the amount and angle of discharge of the material M by the first nozzle 11 and the amount and angle of discharge of the material M by the second nozzle 12 are controlled so as to control the crystal elongation direction and the crystal orientation of the object 8, and to additively manufacture the object 8 having the increased strength against the load in the specific direction.

If the crystal elongation direction and the crystal orientation are controlled using one nozzle, the nozzle is moved and rotated in a complicated manner, and wiring is also made complex. According to the present embodiment, however, the crystal elongation direction and the crystal orientation are controllable even with the first nozzle 11 and the second nozzle 12 kept stationary, and the wiring can also be simplified.

The material M discharged by the first nozzle 11 may differ from the material M discharged by the second nozzle 12. In this case, the object 8 is additively manufactured at least partially from an alloy containing different materials.

One of the first nozzle 11 and the second nozzle 12 may discharge the material M and emit the laser beam L to additively manufacture the object 8, and the other thereof may only emit the laser beam L. The nozzle that only emits the laser beam L can heat the surface of the object 8 to perform the annealing treatment thereon, eliminate the roughness thereof, and/or remove the unnecessary portion therefrom.

For example, to additively manufacture the object 8 of FIG. 4, the first nozzle 11 and the second nozzle 12 are moved by the first moving device 120 and the second moving device 130 so as to discharge the material M and emit the laser beam L in the same direction. In this case, the additive manufacturing is performed using the two nozzles, so that the forming speed is approximately doubled.

The first moving device 120 and the second moving device 130 dispose the first nozzle 11 and the second nozzle 12 in positions sufficiently separated from each other. This arrangement restrains the material M and the carrier gas discharged from the first nozzle 11 from affecting and being affected by the material M and the carrier gas discharged from the second nozzle 12.

For example, when the fin 22 of FIGS. 7 and 8 is additively formed, the first nozzle 11 is moved and rotated by the first moving device 120 so as to discharge the material M and emit the laser beam L in the Z-axis direction. The second nozzle 12 is moved and rotated by the second moving device 130 so as to discharge the material M and emit the laser beam L in a direction orthogonal to the Z-axis (for example, the Y-axis direction).

When the fin 22 of FIG. 7 is additively formed, the second nozzle 12 first additively forms the lowermost ones of the layers 26. The second nozzle 12 discharges the material M and emits the laser beam L in the Y-axis direction. This operation melts or sinters the material M, and stacks a plurality of the layers 26 in the Y-axis direction. Then, the first nozzle 11 forms one of the layers 25 on the layers 26. The first nozzle 11 discharges the material M and emits the laser beam L in the Z-axis direction. This operation melts or sinters the material M, and stacks one of the layers 25 in the Z-axis direction on the layers 26. Subsequently, the stacking of the layers 26 in the Y-axis direction by the second nozzle 12 and the stacking of the layer 25 in the Z-axis direction by the first nozzle 11 are repeated to additively form the fin 22 of FIG. 7.

When the fin 22 of FIG. 8 is additively formed, the second nozzle 12 first additively forms the lowermost ones of the layers 26. The second nozzle 12 stacks a plurality of the layers 26 in the Y-axis direction. Then, the first nozzle 11 forms the layers 25 on the layers 26. The first nozzle 11 stacks the layers 25 in the Z-axis direction on the layers 26. Thus, the fin 22 of FIG. 8 is additively formed.

The second moving device 130 stops the second nozzle 12 in a desired position. While the second nozzle 12 discharges the material M and emits the laser beam L, the table 2 rotates the object 8 about the c-axis. Thus, one of the layers 26 for one turn about the c-axis is formed.

The first moving device 120 stops the first nozzle 11 in a desired position. While the first nozzle 11 discharges the material M and emits the laser beam L, the table 2 rotates the object 8 about the c-axis. Thus, one of the layers 25 for one turn about the c-axis is formed. The first moving device 120 moves the first nozzle 11 in the Y-axis direction, and thereby, the layer 25 spreads in horizontal directions.

As described above, the fins 22 is formed by a simple operation. The fins 22 are, for example, turbine blades. There are a large number of products additively manufacturable by similar simple operations, and the additive manufacturing device 1 can additively manufacture various products.

When the controller 101 includes a computer program for additively manufacturing one of the fins 22, the additive manufacturing device 1 can additively manufacture the fins 22. After using the above-mentioned computer program to additively manufacture one of the fins 22, the additive manufacturing device 1 rotates the object 20 with the table 2, and executes again the above-mentioned computer program to additively manufacture the other of the fins 22. This approach can simplify the computer program for additively manufacturing the object 20.

As described above, the first nozzle 11 and the second nozzle 12 can discharge the material M and emit the laser beam L in directions different from each other. This configuration allows the layers of the material M to be stacked in various directions. As described above, the layers of the material M can be stacked in the upward direction (direction in which the arrow of the Z-axis points) and horizontal directions (X-axis and Y-axis directions). Furthermore, for example, the second nozzle 12 can also discharge the material M and emit the laser beam L in the upward direction so as to stack the layers of the material M in the downward direction (opposite direction of the arrow of the Z-axis).

In the additive manufacturing device 1 according to the embodiment described above, the manufacturing unit 100 discharges the material M from at least one of the first nozzle 11 and the second nozzle 12, and emits the laser beam L from at least one of the first nozzle 11 and the second nozzle 12 to melt or sinter the material M, and thus additively manufactures the object 8 supported on the table 2. The first nozzle 11 is movable with respect to the table 2. The second nozzle 12 is movable with respect to the table 2 and to the first nozzle 11. As a result, the first nozzle 11 and the second nozzle 12 can be appropriately positioned to simultaneously, additively manufacture one object 8 in cooperation. This can shorten the length of time taken for additive manufacturing, enabling efficient additive manufacturing of the object 8. Furthermore, the first nozzle 11 and the second nozzle 12 can mutually cover for their motion ranges to increase the possible additive manufacturing area. In addition, the individual motion ranges of the first nozzle 11 and the second nozzle 12 can be reduced to simplify the wiring. For example, while the first nozzle 11 additively manufactures the object 8, the second nozzle 12 can emit the laser beam L to the object 8 to efficiently eliminate the roughness of the object 8.

The layers of the material M may be laminated in different directions by such methods as tilting the table 2, making a support, and with a jig. However, tilting the table 2 leads to an increase in size of the additive manufacturing device 1 and an increase in cost of a power supply. Using a support or a jig will increase the manufacturing time. In contrast, in the present embodiment, the second nozzle 12 can discharge the material M and emit the laser beam L in a direction different from a direction in which the first nozzle 11 discharges the material M and emits the laser beam L. Thereby, the layers of the material M can be laminated in different directions without tilting the table 2, making a support, or using a jig. That is, the object 8 having various shapes can be additively manufactured efficiently.

The table 2 rotates the object 8 supported on the table 2. This operation can efficiently change the relative position of the object 8 with respect to the first nozzle 11 and the second nozzle 12, thereby reducing the manufacturing time and implementing efficient additive manufacturing of the object 8.

The first moving device 120 includes the first columns 3 that move in the X-axis direction with respect to the table 2, the first cross rail 4 that is connected to the first columns 3 and moves in the Z-axis direction with respect to the first columns 3, the first movable element 11b that is connected to the first cross rail 4 and moves in the Y-axis direction with respect to the first cross rail 4, and the first rotating mechanism 11c that rotates the first nozzle 11 connected to the first movable element 11b about the a1-axis with respect to the first movable element 11b. In other words, the first nozzle 11 is translated by the first columns 3, the first cross rail 4, and the first movable element 11b in the three directions intersecting one another, and is rotated by the first rotating mechanism 11c. This can serve to ensure the rigidity of the first moving device 120 in comparison with, for example, the first nozzle 11 translated by a multi-joint robot arm including a plurality of rotatable parts (joints). Thus, for example, it is possible to additively manufacture the object 8 accurately, with reduced vibration of the first nozzle 11 during discharge of the material M. The first moving device 120 is simpler in operation than the multi-joint robot arm, so that the first nozzle 11 can be moved to desired positions without complex control over the robot arm, leading to avoiding complex wiring.

The first columns 3 are translated in the X-axis direction along the rails of the moving mechanism 3a. Translating the first columns 3 in the X-axis direction while the table 2, the first cross rail 4, the first movable element 11b, and the first rotating mechanism 11c stop moving and rotating makes it easier for the first nozzle 11 to additively manufacture the object 8 linearly extending in the X-axis direction.

The first cross rail 4 is translated in the Z-axis direction along the first columns 3. Translating the first cross rail 4 in the Z-axis direction while the table 2, the first columns 3, the first movable element 11b, and the first rotating mechanism 11c stop moving and rotating makes it easier for the first nozzle 11 to additively manufacture the object 8 linearly extending in the Z-axis direction.

The first movable element 11b is translated in the Y-axis direction along the first cross rail 4. Translating the first movable element 11b in the Y-axis direction while the table 2, the first columns 3, the first cross rail 4, and the first rotating mechanism 11c stop moving and rotating makes it easier for the first nozzle 11 to additively manufacture the object 8 linearly extending in the Y-axis direction.

By simultaneously moving the first columns 3, the first cross rail 4, and the first movable element 11b at a constant speed, the first nozzle 11 can easily additively manufacture the object 8 linearly extending in any direction in the three-dimensional space.

The X-axis direction of movement of the first columns 3 is orthogonal to the extending direction of the c-axis serving as the center of rotation of the object 8. The Z-axis direction of movement of the first cross rail 4 is parallel to the extending direction of the c-axis. The Y-axis direction of movement of the first movable element 11b is orthogonal to the X-axis direction, and also orthogonal to the Z-axis direction. The a1-axis serving as the center of rotation of the first nozzle 11 extends in the X-axis direction. Thus, the first moving device 120 translates the first nozzle 11 in the three directions orthogonal to one another, and as a result, the moving range of the first nozzle 11 can be increased.

The second moving device 130 includes the second column 5 that rotates about the c2-axis with respect to the table 2, the second movable element 6a that is connected to the second column 5 and moves in the w-axis direction with respect to the second column 5, the second cross rail 6 that is connected to the second movable element 6a and moves in the v-axis direction with respect to the second movable element 6a, and the second rotating mechanism 12b that rotates the second nozzle 12 connected to the second cross rail 6 with respect to the second cross rail 6 about the a2-axis tilted with respect to the c2-axis. In other words, the second nozzle 12 is translated in the two directions by the second movable element 6a and the second cross rail 6, and is rotated by the second column 5 and the second rotating mechanism 12b about the two axes tilted with respect to each other. This configuration can more easily ensure rigidity of the second moving device 130 than, for example, in a case where the second nozzle 12 is moved by a multi-joint robot arm having a plurality of rotary parts (joints) that rotate about parallel axes. As a result, for example, the second nozzle 12 is restrained from vibrating when the material M is discharged, and the object 8 can be accurately additively manufactured. The second nozzle 12 can be moved to the desired position without complicated control such as that used for the robot arm.

The second movable element 6a is translated in the w-axis direction along the second column 5. While the movement and the rotation of the second column 5, the second cross rail 6, and the second rotating mechanism 12b are stopped, translating the second movable element 6a in the w-axis direction allows the second nozzle 12 to easily additively manufacture the object 8 linearly extending in the w-axis direction.

The second cross rail 6 is translated in the v-axis direction that is the extending direction of the second cross rail 6. While the movement and the rotation of the second column 5, the second movable element 6a, and the second rotating mechanism 12b are stopped, translating the second cross rail 6 in the v-axis direction allows the second nozzle 12 to easily additively manufacture the object 8 linearly extending in the v-axis direction.

When the second movable element 6a moves in the w-axis direction at a constant speed, and at the same time, the table 2 rotates at a constant speed, the second nozzle 12 can easily additively manufacture the object 8 that spirally extends on a side surface of a cylindrical table.

When the second movable element 6a moves in the w-axis direction at a constant speed, and the second cross rail 6 moves in the v-axis direction at a constant speed, and at the same time, the table 2 rotates at a constant speed, the second nozzle 12 can easily additively manufacture the object 8 that spirally extends on a side surface of a truncated cone.

The c2-axis serving as the center of rotation of the second column 5 extends parallel to the c-axis. The w-axis direction of movement of the second movable element 6a is parallel to the extending direction of the c2-axis. The v-axis direction of movement of the second cross rail 6 is orthogonal to the w-axis direction. The extending direction of the a2-axis serving as the center of rotation of the second nozzle 12 is orthogonal to the extending direction of the c2-axis. Thus, the second moving device 130 translates the second nozzle 12 in the two directions orthogonal to each other and rotates the second nozzle 12 about the two axes extending in the directions orthogonal to each other, and as a result, the moving range of the second nozzle 12 can be increased.

Figure 12:
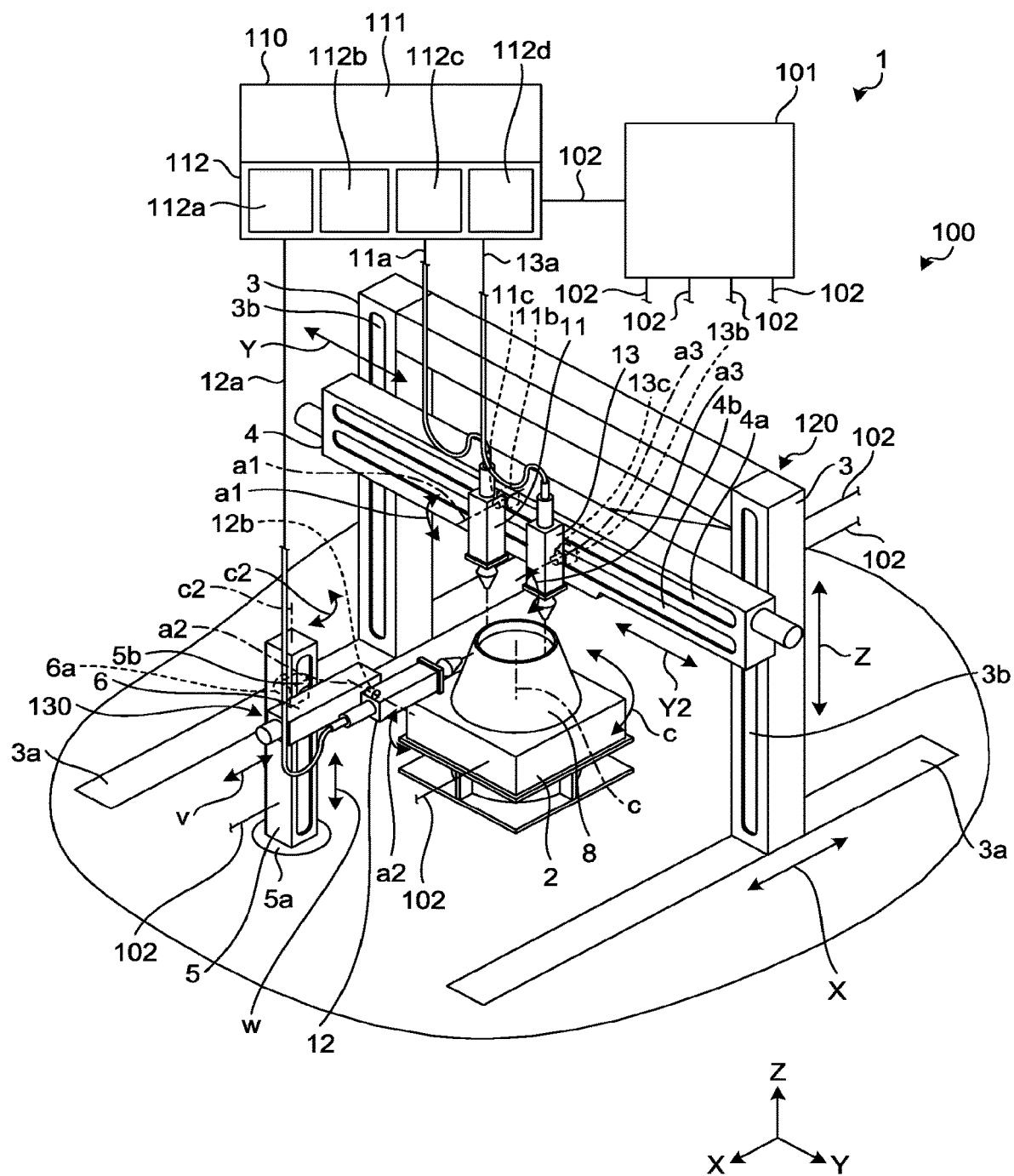
FIG. 12 is an exemplary perspective view schematically illustrating the additive manufacturing device according to the embodiment of FIG. 9.

FIG. 12 is an exemplary perspective view schematically illustrating the additive manufacturing device 1 according to the embodiment of FIG. 9. In the example of FIG. 12, the manufacturing unit 100 further includes the third nozzle 13. The third nozzle 13 is supplied with the material M in a third tank 112d from the material supply device 112 through a supply pipe 13a.

The first moving device 120 further includes a third movable element 13b and a third rotating mechanism 13c. The third movable element 13b is an example of a sixth moving unit. The third rotating mechanism 13c is an example of a fourth rotating unit.

The third movable element 13b is movable in the Y2-axis direction with respect to the first cross rail 4, for example, by a moving mechanism 4b provided in the first cross rail 4. The Y2-axis direction is an example of the third direction, and is a direction parallel to the Y-axis direction.

The moving mechanism 4b includes various components for moving the third movable element 13b, such as a ball screw and an actuator provided inside the first cross rail 4. The moving mechanism 4b for moving the third moving body 13b is separated from the moving mechanism 4a for moving the first movable element 11b. Thus, the third nozzle 13 is movable in the Y2-axis direction independently from the first nozzle 11.

The third movable element 13b is, for example, a nut of the ball screw disposed in the first cross rail 4. Thus, the third movable element 13b is connected to the moving mechanism 4b of the first cross rail 4. The third movable element 13b is moved along the first cross rail 4 by the moving mechanism 4b.

The third nozzle 13 is connected to the third movable element 13b. The third rotating mechanism 13c rotates the third nozzle 13 about the a3-axis with respect to the third movable element 13b. The a3-axis is an example of a fifth axis, and extends in the X-axis direction. In other words, the a3-axis extends parallel to the a1-axis. In FIG. 12, the a3-axis and an arrow indicating the direction of rotation about the a3-axis are each labeled with a sign a3. The third rotating mechanism 13c includes various components for rotating the third nozzle 13, such as an actuator provided inside the third nozzle 13.

The first moving device 120 uses the first columns 3 to translate the third nozzle 13 in the X-axis direction with respect to the table 2. The first moving device 120 uses the first cross rail 4 to translate the third nozzle 13 in the Z-axis direction with respect to the table 2. The first moving device 120 uses the third movable element 13b to translate the third nozzle 13 in the Y-axis direction with respect to the table 2. The first moving device 120 uses the third rotating mechanism 13c to rotate the third nozzle 13 about the a3-axis. As described above, the first moving device 120 moves the third nozzle 13 with respect to the table 2. The first moving device 120 also moves the third nozzle 13 with respect to the first nozzle 11 and the second nozzle 12.

The manufacturing unit 100 discharges the material M from at least one of the first nozzle 11, the second nozzle 12, and the third nozzle 13. The manufacturing unit 100 also emits the laser beam L from at least one of the first nozzle 11, the second nozzle 12, and the third nozzle 13 to melt or sinter the material M, and thus additively manufactures the object 8 supported on the table 2.

For example, to additively manufacture the object 8 in the example of FIG. 3, the third nozzle 13, instead of the second nozzle 12, can be disposed linearly symmetric to the first nozzle 11. The first nozzle 11 and the third nozzle 13 may also be linearly symmetric with respect to the c-axis. The third nozzle 13 and the first nozzle 11 as arranged above additively manufacture the object simultaneously, thereby shortening the manufacturing time.

When the same surface of the object 8 is formed using two nozzles as illustrated in FIG. 4, the forming by the combination of the first nozzle 11 and the third nozzle 13 is easier than the forming by the combination of the first nozzle 11 and the second nozzle 12. Both the first nozzle 11 and the third nozzle 13 are supported by the first cross rail 4. Accordingly, the first nozzle 11 and the third nozzle 13 are arranged substantially at the same location (height) in the vertical direction (Z-axis direction) without large movements. As a result, the distances between the nozzles and the object 8 can be more easily adjusted. Furthermore, the first cross rail 4 can be located over the table 2. In addition, the third nozzle 13 has a larger movable range than that of the second nozzle 12. As a result, the third nozzle 13 can be more easily disposed over the table 2 and the object 8 than the second nozzle 12. Because of the above, the third nozzle 13 can be more easily used than the second nozzle 12 for the forming of the example of FIG. 4, in which the third nozzle 13 is arranged side by side with the first nozzle 11, and faces the same direction as the first nozzle 11.

In the additive manufacturing device 1 according to the embodiment described above, the manufacturing unit 100 further includes the third nozzle 13. The first moving device 120 includes the third movable element 13b that is connected to the first cross rail 4 and moves in the Y-axis direction with respect to the first cross rail 4, and includes the third rotating mechanism 13c that rotates the third nozzle 13 connected to the third movable element 13b about the a3-axis with respect to the third movable element 13b. As describe above, the first columns 3 and the first cross rail 4 of the first moving device 120 work to translate the first and third nozzles 11 and 13 in the two directions intersecting each other. This enables relative movement of the first nozzle 11 and the third nozzle 13 while restraining the additive manufacturing device 1 from increasing in size. The third nozzle 13 may be moved by a moving device different from the first moving device 120.

The a3-axis serving as the center of rotation of the third nozzle 13 extends parallel to the a1-axis serving as the center of rotation of the first nozzle 11. This facilitates the arrangement of the third rotating mechanism 13c and the second nozzle in the first moving device 120, preventing the additive manufacturing device 1 from increasing in size.

As described above, the additive manufacturing device 1 may include only the first nozzle 11 and the third nozzle 13 without including the second nozzle 12. In this case, the third nozzle 13 is an example of the second nozzle. As described above, the forming of the example of FIG. 4 is made easier by the combination of the first nozzle 11 and the third nozzle 13. Accordingly, the additive manufacturing device 1 can improve the efficiency of the additive manufacturing, even without the second nozzle 12, while including only the first nozzle 11 and the third nozzle 13.

While the embodiments have been described above, when the objects 8 having various shapes are additively manufactured, the nozzles are moved and rotated in various directions. If, however, a multi-joint robot arm moves and rotates one nozzle to additively manufacture the object 8, the supporting method and the control method are made complicated. In addition, the turning accuracy or the rigidity may be insufficient. In contrast, the additive manufacturing device 1 of the described embodiments can move and rotate a plurality of nozzles, that is, the first nozzle 11 and the second nozzle 12. As a result, the forming time can be restrained from increasing even if the additively manufacturable range is expanded; the complicated support and control such as those of the multi-joint robot arm are not required; the movement and rotation of the first nozzle 11 and the second nozzle 12 can be simplified; and the additive manufacturing can be increased in speed and range. In addition, the forming time is reduced by performing the additive manufacturing using a plurality of nozzles at the same time. Accordingly, the additive manufacturing device 1 of the embodiments can improve the efficiency of the additive manufacturing.

While some embodiments have been described, these embodiments have been presented as examples, and are not intended to limit the scope of the invention. These novel embodiments can be implemented in various other forms, and various omissions, substitutions, and modifications can be made without departing from the gist of the invention.

These embodiments and modifications thereof are included in the scope and the gist of the invention, and are included in the invention described in the claims and the equivalent scope thereof.

EXPLANATIONS OF LETTERS OR NUMERALS

1 Additive manufacturing device
2 Table
3 First columns
4 First cross rail
5 Second column
6 Second cross rail
6a Second movable element
8 object
11 First nozzle
11b First movable element
11c First rotating mechanism
12 Second nozzle
12b Second rotating mechanism
13 Third nozzle
13b Third movable element
13c Third rotating mechanism
20 object
100 Manufacturing unit
120 First moving device
130 Second moving device
M Material
L Laser beam

The invention claimed is:

1. An additive manufacturing device comprising:
a table configured to support an object; and
a manufacturing unit comprising a first nozzle and a second nozzle, the first nozzle that is movable with respect to the table, the second nozzle that is movable with respect to the table and to the first nozzle, the manufacturing unit being configured to discharge powder from at least one of the first nozzle and the second nozzle, and emit an energy beam from at least one of the first nozzle and the second nozzle to melt or sinter the powder to additively manufacture the object supported on the table wherein
the second nozzle is capable of discharging the powder and emitting the energy beam in a direction different from a direction in which the first nozzle discharges the powder and emits the energy beam.

2. An additive manufacturing device comprising:
a table configured to support an object; and
a manufacturing unit comprising a first nozzle and a second nozzle, the first nozzle that is movable with respect to the table, the second nozzle that is movable with respect to the table and to the first nozzle, the manufacturing unit being configured to discharge powder from at least one of the first nozzle and the second nozzle, and emit an energy beam from at least one of the first nozzle and the second nozzle to melt or sinter the powder to additively manufacture the object supported on the table wherein
the table is configured to rotate the object about a first axis.

3. The additive manufacturing device according to claim 2, wherein
the manufacturing unit comprises a first moving device, and
the first moving device comprises:
a first moving unit configured to move in a first direction with respect to the table,
a second moving unit connected to the first moving unit and configured to move with respect to the first moving unit in a second direction intersecting the first direction,
a third moving unit connected to the second moving unit and configured to move with respect to the second moving unit in a third direction intersecting the second direction, and
a first rotating unit configured to rotate the first nozzle connected to the third moving unit about a second axis with respect to the third moving unit.

4. The additive manufacturing device according to claim 3, wherein
the first direction is orthogonal to an extending direction of the first axis,
the second direction is parallel to the extending direction of the first axis,
the third direction is orthogonal to the first direction and to the second direction, and
the second axis extends in the first direction.

5. The additive manufacturing device according to claim 3, wherein
the manufacturing unit comprises a second moving device, and
the second moving device comprises:
a second rotating unit configured to rotate about a third axis with respect to the table,
a fourth moving unit connected to the second rotating unit and configured to move with respect to the second rotating unit in a fourth direction,
a fifth moving unit connected to the fourth moving unit and configured to move with respect to the fourth moving unit in a fifth direction intersecting the fourth direction, and
a third rotating unit configured to rotate, about a fourth axis, the second nozzle connected to the fifth moving unit with respect to the fifth moving unit, the fourth axis tilted with respect to the third axis.

6. The additive manufacturing device according to claim 5, wherein
the third axis extends parallel to the first axis,
the fourth direction is parallel to an extending direction of the third axis,
the fifth direction is orthogonal to the fourth direction, and
an extending direction of the fourth axis is orthogonal to the extending direction of the third axis.

7. The additive manufacturing device according to claim 5, wherein
the manufacturing unit comprises a third nozzle movable with respect to the table, the first nozzle, and the second nozzle, the manufacturing unit configured to discharge the powder from at least one of the first to third nozzles, and emit the energy beam from at least one of the first to third nozzles to melt or sinter the powder to additively manufacture the object on the table, and
the first moving device comprises:
a sixth moving unit connected to the second moving unit and configured to move in the third direction with respect to the second moving unit, and
a fourth rotating unit configured to rotate the third nozzle connected to the sixth moving unit about a fifth axis with respect to the sixth moving unit.

8. The additive manufacturing device according to claim 3, wherein
the first moving device comprises:
a sixth moving unit connected to the second moving unit and configured to move in the third direction with respect to the second moving unit, and
a fourth rotating unit configured to rotate the second nozzle connected to the sixth moving unit about a fifth axis with respect to the sixth moving unit.

9. The additive manufacturing device according to claim 7, wherein
the fifth axis extends parallel to the second axis.

10. An additive manufacturing method comprising:
disposing a first nozzle and a second nozzle in mutually different positions, the second nozzle movable with respect to the first nozzle;
discharging powder from the first nozzle and the second nozzle; and
emitting an energy beam from each of the first nozzle and the second nozzle to melt or sinter the powder to form a layer, wherein
the second nozzle is capable of discharging the powder and emitting the energy beam in a direction different from a direction in which the first nozzle discharges the powder and emits the energy beam.

* * * * *